(No Model.)
J. W. JOHNSON.
CROSSCUT SAW.
No. 542,856. Patented July 16, 1895.
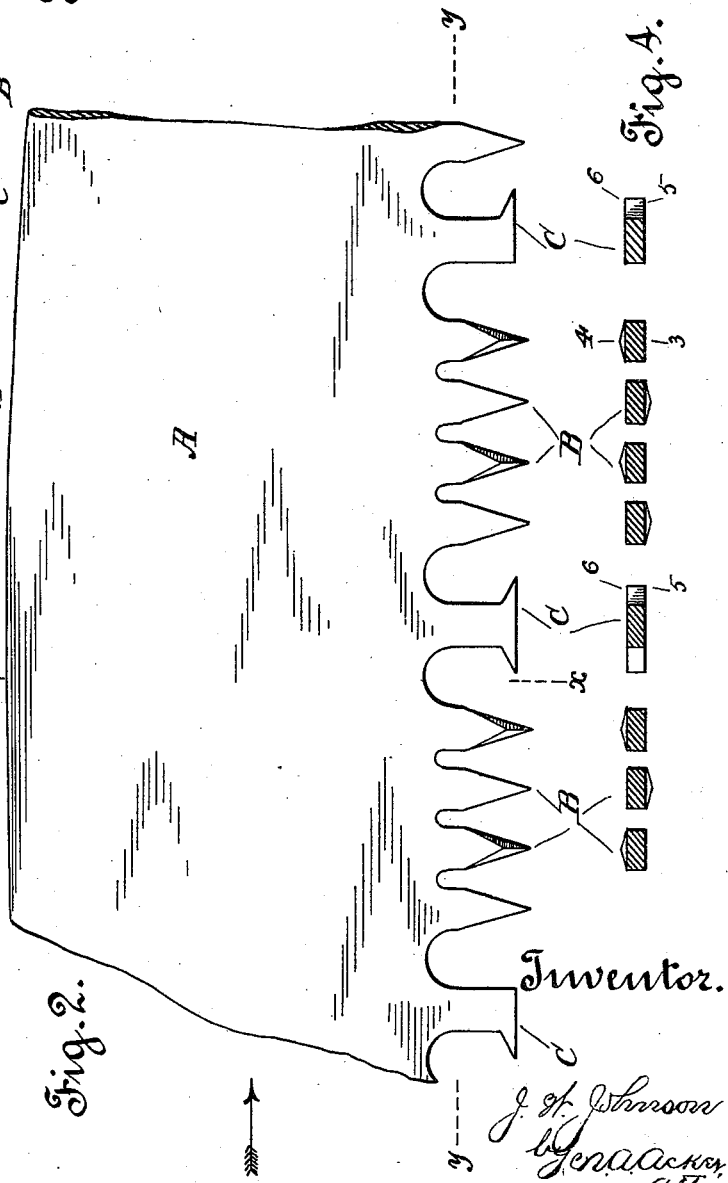

UNITED STATES PATENT OFFICE.

JAMES W. JOHNSON, OF TRUCKEE, CALIFORNIA.

CROSSCUT-SAW.

SPECIFICATION forming part of Letters Patent No. 542,856, dated July 16, 1895.

Application filed November 22, 1894. Serial No. 529,560. (No model.)

*To all whom it may concern:*

Be it known that I, JAMES W. JOHNSON, a citizen of the United States, residing at Truckee, in the county of Nevada and State of California, have invented certain new and useful Improvements in Crosscut-Saws; and I do hereby declare the following to be a full, clear, and exact description of said invention, such as will enable others skilled in the art to which it most nearly appertains to make, use, and practice the same.

The present invention relates to a certain new and useful improvement in crosscut-saws, the object of which is to prevent the binding of the saw while being moved through the cut of a log, and to provide a saw which does not necessitate the setting of the teeth in order to place the saw in proper condition to cut.

The invention relates more especially to the construction of the drag-tooth of a crosscut-saw.

In an ordinary crosscut-saw the drag-tooth corresponds in thickness to the cutting-tooth, but is of less length. As the cutting wears down it is necessary that the drag-tooth be shortened correspondingly. This is done by the "swaging" of the drag-tooth, which reduces the length. However, as the particles of metal are forced together by the swaging, in order to reduce the length of the drag-tooth the thickness of the tooth is increased until in time the faces or sides of the teeth project beyond the sides or face-walls of the cutting-teeth. It then becomes necessary to file away the faces of the drag-teeth, else the saw will bind within the cut. It is obvious that as both teeth originally are made equal in thickness, it requires only a small amount of swaging in order to cause the face of the drag-teeth to project beyond the face of the cutting-teeth. In order to make the saw properly cut, it is necessary that the cutting-teeth be oppositely bent or twisted to such an angle as will bring the cutting-edge of the teeth beyond the face or sides of the drag-teeth. This is what is termed the "setting" of the saw-teeth which is a most delicate operation, as the teeth must be accurately set in order to permit of the saw making a proper cut.

In order to overcome the necessity of setting the saw-teeth and prevent the liability of the saw binding within the cut by reason of the swaging of the drag-teeth, causing the faces to project beyond the sides of the cutting-teeth, I propose to make the drag-teeth of a uniform thickness from top to bottom, but of a less thickness than the cutting-teeth, so that when the teeth of the saw are in direct line the edge of the cutting-teeth will project beyond the faces of the drag-teeth. By making the drag-teeth of less thickness than the cutting-teeth, I compensate for the increase in the thickness thereof as the edge of the tooth is swaged or hammered down in order to reduce the length thereof to correspond to the wear of the cutting-teeth.

Referring to the drawings forming a part of this application, Figure 1 is a view in side elevation of the blade of a crosscut-saw. Fig. 2 is an enlarged broken detail view of the same. Fig. 3 is a vertical sectional view on line $x$ $x$, Fig. 2, viewed in the direction of arrow; and Fig. 4 is a longitudinal sectional top plan view, taken on line $y$ $y$, Fig. 2.

The letter A indicates the blade of a crosscut-saw; B, the cutting-teeth thereof, and C the drag-teeth. The drag-teeth being merely used for the purpose of removing the dust from the cut and not serving as cutting-teeth, are made shorter than the cutting-teeth. Inasmuch as saws of this class cut only for about one-half their length with each stroke thereof, it is not necessary that double drag-teeth be made use of throughout. Consequently I have shown the single drag-tooth at each end of the center, the drag-toe being faced in opposite directions, and the double drag-tooth at the center.

By reference to Fig. 3 it will be noticed that the entire saw is cut away at an incline from the point 1 of the cutting-teeth to the top or point 2 of the saw-blade, forming what is known as the "patent grounded blade." This is the shape of the crosscut-saw as it leaves the factory, the drag and cutting teeth being of the same thickness and cut upon the same incline or pitch. The thickness of the cutting-teeth is shown by numerals 3 4, Fig. 3. After the blade has been subjected to the process known as "patent ground," which cuts, as before stated, the drag-teeth, the cutting-teeth and blade, at a gradual incline, making the drag and cutting teeth of the same thickness, I then cut or file away the incline of the drag-teeth so as to make the same of a uniform thickness throughout, but of less thickness than the cutting-teeth. The thickness of the drag-teeth is shown by numerals 5 6, Fig. 3, being considerably less than the cutting-teeth, which permits the particles of metal to be forced together during the swaging of the drag-teeth without causing the sides of the said drag-teeth to project beyond the cutting-teeth.

By forming the drag-teeth as described it is not necessary to set the cutting-teeth of the saw, for when the saw leaves the factory the cutting-edge of the cutting-teeth will project beyond the faces of the drag-teeth, although the teeth are in line, as will be seen by reference to Fig. 4.

Having thus described my invention, what I claim as new, and desire to secure protection in by Letters Patent, is—

1. As a new article of manufacture a cross cut saw having its drag teeth of a less thickness than the cutting teeth.

2. As a new article of manufacture a cross cut saw, the drag teeth of which are of a uniform thickness, but of less thickness than the cutting teeth, whereby the cutting edge of the cutting teeth projects beyond the sides of the drag teeth.

In testimony whereof I affix my signature in presence of two witnesses.

JAMES W. JOHNSON.

Witnesses:
N. A. ACKER,
LEE D. CRAIG.